Patented Aug. 14, 1945

2,381,859

UNITED STATES PATENT OFFICE 2,381,859

METHOD OF REMOVING MERCAPTANS FROM HYDROCARBON OIL

George W. Ayers, Chicago, and Lawrence M. Henderson, Winnetka, Ill., assignors to The Pure Oil Company, Chicago, Ill., a corporation of Ohio No Drawing. Application June 18, 1943, Serial No. 491,378

4 Claims. (Cl. 196—30)

This invention relates to a method for removing weakly acidic bodies from substantially neutral water-immiscible organic liquids, and is more particularly concerned with the removal of mercaptans from hydrocarbon oils such as gasoline.

In Patents #2,297,621 and 2,316,753, there is disclosed and claimed a process for the removal of weakly acidic bodies such as mercaptans from hydrocarbon liquids by means of aqueous solutions of caustic alkali containing alkali metal naphthenates and solventizers therefor. The process covered by the claims of these patents is known as the "Mercapsol" process and the treating solution is known as the "Mercapsol" solution.

The effectiveness of "Mercapsol" solutions for removing or extracting mercaptans from hydrocarbon oil generally varies directly with the concentration of free alkali metal hydroxide and alkali metal naphthenates in the solution. Thus, more concentrated alkali solutions containing higher concentrations of alkali metal naphthenates remove larger amounts of mercaptans from gasoline or other hydrocarbons. However, there is a practical limit to the concentration of both the free alkali and the alkali metal naphthenates in the treating solution due to the fact that as the concentrations of the two are increased the naphthenates precipitate out of solution. A further reason why the concentration of these ingredients must be limited is that at lower temperatures precipitation of naphthenates from the solution occurred. Although a solution may be satisfactory under summer operating conditions, a drop in atmospheric temperature will cause precipitation in the solution. Furthermore, as concentration of free alkali and alkali metal naphthenates increase the viscosity of the treating solution increases to a point where the solution cannot be readily handled and causes emulsion difficulties when mixed with the hydrocarbon oil to be treated.

We have discovered that the ability of aqueous alkali solutions to extract acidic bodies such as mercaptans from water-immiscible liquids such as hydrocarbon oils, and particularly those alkali solutions containing solubility promoters such as alkali metal naphthenates, can be materially enhenced by incorporating in the solution "methyl cellosolve," otherwise known as glycol monomethyl ether.

An object of the invention is to provide an improved process for extracting weakly acidic bodies from otherwise neutral water-immiscible organic liquids.

Another object of the invention is to provide an improved method for extracting mercaptans from hydrocarbon oils such as gasoline.

A further object of the invention is to provide a method for improving the ability of aqueous alkali solutions to extract acidic bodies such as mercaptans from otherwise neutral water-immiscible organic liquids such as hydrocarbon oils.

Still another object of the invention is to provide a method for improving the mercaptan extracting ability of "Mercapsol" solution.

Other objects of the invention will be apparent from the following description.

"Methyl cellosolve" has the unique distinction of being soluble in large amounts in highly concentrated aqueous caustic alkali solutions, and of being soluble in aqueous alkali solutions containing other solubility promoters. In our researches we have tried a number of glycol ethers and, although various glycol ethers are soluble to some extent in concentrated alkali solutions and are compatible in small amounts with alkali solutions containing solubility promoters such as alkali metal naphthenates, their solubility and compatibility are limited. On the other hand, "methyl cellosolve" can be dissolved in such solutions in sufficiently large amounts so as to make it possible to substantially completely extract acidic bodies such as mercaptans from the liquid undergoing treatment.

We have found that if "methyl cellosolve" is dissolved in alkali metal hydroxide solutions containing from approximately 12 to 25% of alkali metal hydroxide in amounts ranging from approximately 25% by weight up to the maximum amount of "methyl cellosolve" which is compatible with the solution, the resulting solution is capable of removing in excess of 90% of the mercaptans present in gasoline. Furthermore, we have found that "methyl cellosolve" in various quantities can be added to aqueous alkali solutions containing known types of solubility promoters and enhance the ability of the solution to extract mercaptans from hydrocarbon oils. Other glycol ethers are not compatible with aqueous alkali solution containing solubility promoters in sufficient quantities to materially enhance the mercaptan extracting ability of the solution.

In order to demonstrate the effectiveness of "methyl cellosolve" as a solubility promoter in connection with the extraction of mercaptans from gasoline, a number of extractions were made using various types of solutions to remove mercaptans from blended straight-run and thermal, pressure-cracked gasoline. The results on the various tests are tabulated in the following table. Each test was made by shaking 300 cc. of untreated gasoline with 21 cc. of treating solution for 15 minutes in a nitrogen atmosphere and then determining the mercaptan and disulfide sulfur of the treated gasoline. Mercaptan and disulfide sulfur determinations on the gasoline samples were also made before treating.

In the table, the term "Mercapsol" is used to designate a treating solution made by mixing together the following ingredients in the proportions noted thereafter:

| | Percent by weight |
|---|---|
| Sodium hydroxide | 18.3 |
| Naphthenic acids (240–260XX) | 18.6 |
| Meta-para cresol | 6.4 |
| Water | 56.7 |

The naphthenic acids used in preparing the solution correspond to those described in column 2, Table II on page 3 of Henderson et al, Patent #2,297,621. The free sodium hydroxide content of the resulting solution is 12.6% by weight. By "free sodium hydroxide" is meant the sodium hydroxide over and above that required to react with other ingredients of the solution.

In preparing various solutions in which glycol ethers were mixed with "Mercapsol," as indicated in the table, the glycol ether was substituted for an equal portion of the water of the "Mercapsol" solution.

under atmospheric conditions. Separation into two layers occurred.

In preparing the solutions of the various ethers and "Mercapsol," 14% of the ether was used except in those cases where the ether was not compatible with the "Mercapsol" when 14% by weight was substituted for the water in the "Mercapsol" solution. Thus, in the case of treating solutions 3 and 4, "cellosolve" and "methyl carbitol" were not compatible to the extent of 14% with the "Mercapsol" solution.

Instead of enhancing the ability of "Mercapsol" solution to extract mercaptans from the gasoline, "cellosolve" and "methyl carbitol" actually detracted from the mercaptan-extracting ability of the "Mercapsol" solution. On the other hand, as is apparent from treating solutions numbers 5, 8, 12, 17 and 18, the "methyl cellosolve" was compatible with the "Mercapsol" in the amount of 14% by weight and greater, and materially improved the ability of the "Mercapsol" solution to extract mercaptans from the gasoline. Solution 19 is a modified "Mercapsol" solution in which 25% by weight of "methyl cellosolve" has been substituted for water.

Treating solution 15 demonstrates that "methyl cellosolve" acts as a solventizer for alkali metal naphthenates. This solution contained no solventizer other than the "methyl cellosolve." Thus "methyl cellosolve" can be used in conjunc-

Table

| Treating solution number | Composition (%) of treating solution by weight | Mercaptan S in untreated gasoline | Mercaptan S in treated gasoline | Disulfide S in untreated gasoline | Disulfide S in treated gasoline | Mercaptan S removed |
|---|---|---|---|---|---|---|
| | | Percent | Percent | Percent | Percent | Percent |
| 1 | NaOH—15%; H$_2$O—85% | 0.0189 | 0.0095 | 0.0048 | 0.0044 | 49.7 |
| 2 | Mercapsol | 0.0189 | 0.0065 | 0.0048 | 0.0058 | 65.6 |
| 3 | Mercapsol + Cellosolve—7% | 0.0189 | 0.0051 | 0.0048 | 0.0073 | 59.8 |
| 4 | Mercapsol + Methyl Carbitol—7% | 0.0189 | 0.0042 | 0.0048 | 0.0089 | 56.1 |
| 5 | Mercapsol + Methyl Cellosolve—14% | 0.0189 | 0.0033 | 0.0048 | 0.0065 | 73.6 |
| 6 | NaOH—15%; H$_2$O—85% | 0.0325 | 0.0149 | 0.0011 | 0.0031 | 48.0 |
| 7 | Mercapsol | 0.0325 | 0.0093 | 0.0011 | 0.0034 | 64.3 |
| 8 | Mercapsol + Methyl Cellosolve—14% | 0.0325 | 0.0049 | 0.0011 | 0.0046 | 74.1 |
| 9 | NaOH—12.6%; H$_2$O—87.4% | 0.0330 | 0.0135 | 0.002 | 0.003 | 55.1 |
| 10 | Mercapsol | 0.0330 | 0.0102 | 0.002 | 0.003 | 66.1 |
| 11 | NaOH—12.6%; H$_2$O—73.4%; Methyl Cellosolve—14% | 0.0330 | 0.0125 | 0.002 | 0.002 | 62.1 |
| 12 | Mercapsol + Methyl Cellosolve—14% | 0.0330 | 0.0060 | 0.002 | 0.003 | 78.8 |
| 13 | NaOH—12.6%; H$_2$O—59.3%; Methyl Cellosolve—28.1% | 0.0330 | 0.0107 | 0.002 | 0.002 | 67.6 |
| 14 | H$_2$O—71.9%; Methyl Cellosolve—28.1% | 0.0330 | 0.0330 | 0.002 | 0.002 | None |
| 15 | NaOH—12.6%; Na naphthenates—20.4%; Methyl Cellosolve—6.4%; H$_2$O—60.6% | 0.0330 | 0.0111 | 0.002 | 0.004 | 60.3 |
| 16 | NaOH—12.6%; Methyl Cellosolve—42.1%; H$_2$O—45.3% | 0.0330 | 0.006 | 0.002 | 0.002 | 81.8 |
| 17 | Mercapsol + Methyl Cellosolve—30% | 0.0330 | 0.0032 | 0.002 | 0.004 | 84.2 |
| 18 | Mercapsol + Methyl Cellosolve—40% | 0.0330 | 0.0019 | 0.002 | 0.004 | 88.2 |
| 19 | NaOH—20.3%; Na napthenates—17.1%; Na cresylates—6.4%; Methyl Cellosolve—25%; H$_2$O—31.2% | 0.0330 | 0.0019 | 0.002 | 0.001 | 94.3 |
| 20 | NaOH—20.3%; Methyl Cellosolve—50.5%; H$_2$O—29.2% | 0.0330 | 0.0012 | 0.002 | 0.002 | 96.4 |
| 21 | NaOH—15%; Methyl Cellosolve—14%; H$_2$O—71% | 0.0330 | 0.0125 | 0.002 | 0.002 | 62.0 |
| 22 | NaOH—12.6%; Methyl Cellosolve—42.1%; H$_2$O—45.3% | 0.0330 | 0.006 | 0.002 | 0.002 | 82.0 |
| 23 | NaOH—20.0%; Methyl Cellosolve—40.0%; H$_2$O—40.0% | 0.0205 | 0.0009 | 0.005 | 0.005 | 93.0 |
| 24 | NaOH—25.0%; Methyl Cellosolve—28.1%; H$_2$O—46.9% | 0.0205 | 0.0019 | 0.005 | 0.003 | 91.0 |
| 25 | NaOH—30%; Methyl Cellosolve—28.1%; H$_2$O—41.9% | (¹) | (¹) | (¹) | (¹) | (¹) |
| 26 | NaOH—25%; Methyl Cellosolve—40%; H$_2$O—35% | | | | | |
| 27 | NaOH—35.0%; H$_2$O—65% | 0.0205 | 0.0103 | 0.005 | 0.005 | 50.0 |
| 28 | NaOH—20%; Methyl Carbitol—18.8%; H$_2$O—61.2% | 0.0205 | 0.0065 | 0.005 | 0.004 | 68.0 |
| 29 | NaOH—25%; Methyl Carbitol—40%; H$_2$O—35% | (¹) | (¹) | (¹) | (¹) | (¹) |
| 30 | NaOH—20%; Methyl Carbitol—40%; H$_2$O—40% | | | | | |
| 31 | NaOH—25.2%; H$_2$O—74.8% | 0.0210 | 0.0107 | 0.003 | 0.004 | 44.0 |
| 32 | Cellosolve—56.2%; H$_2$O—43.8% | 0.0210 | 0.0200 | 0.003 | 0.004 | 0 |
| 33 | NaOH—12.6%; Cellosolve—28.1%; H$_2$O—59.3% | 0.0210 | 0.006 | 0.003 | 0.005 | 62.0 |
| 34 | NaOH—30%; Cellosolve—28.1%; H$_2$O—41.9% | (¹) | (¹) | (¹) | (¹) | (¹) |
| 35 | NaOH—19.3%; Cellosolve—18.1%; H$_2$O—62.6% | | | | | |
| 36 | NaOH—25.0%; Cellosolve—40.0%; H$_2$O—35% | | | | | |
| 37 | NaOH—20%; Cellosolve—40%; H$_2$O—40% | | | | | |

¹ Incompatible.

In addition to the various solutions included in the foregoing table, an attempt was made to prepare solutions by mixing one of the following compounds with "Mercapsol" solution: "Butyl cellosolve"; "phenol cellosolve"; "diethyl cellosolve"; "carbitol"; "butyl carbitol"; diethyl carbitol" and tetraethylene glycol dimethyl ether. None of these compounds was compatible with "Mercapsol" to the extent of even 7% by weight tion with alkali metal naphthenates either with or without other solventizers such as alkali metal phenolates.

The unusual ability of "methyl cellosolves" to improve the mercaptan-extracting ability of alkali metal hydroxide solutions is demonstrated by solutions 20, 23 and 24. In these three tests, the extraction of mercaptans was well over 90%. The ability of "methyl cellosolve" to almost completely remove mercaptans from gasoline is due to its solubility in large amounts in caustic alkali solution of high concentration. As the concentration of free alkali hydroxide in the solution decreases the ability of the solution to extract mercaptans decreases until at zero alkali concentration the solution is valueless as shown by solution 14. However, there is an upper limit of concentration of caustic alkali which is critical, since above a certain alkali concentration the amount of "methyl cellosolve" which can be dissolved decreases and the mercaptan-extracting ability of the solution likewise decreases. The maximum alkali concentration is approximately 25% as shown by treating solution 24. At a caustic soda concentration of 25% by weight and a "methyl cellosolve" concentration of 28.1%, the mercaptan sulfur removed was slightly less than in the case of solutions 20 and 23. 28.1% of "methyl cellosolve" represents about the maximum amount of "methyl cellosolve" which is soluble in a caustic soda solution of this concentration. When the amount of "methyl cellosolve" was increased, or the amount of caustic soda was increased, separation of the solution into two layers resulted, so that it could not be used, as shown by treating solutions 25 and 26.

Thus, "methyl cellosolve" is unusual among the glycol ethers in that it is soluble in large enough amounts in concentrated alkali metal hydroxide solutions containing between approximately 12 and 25% by weight of alkali metal hydroxide, to give a treating solution which is capable of substantially completely extracting mercaptans from hydrocarbon oils. Moreover, its compatibility with alkali solutions containing other solubility promoters is such that it greatly enhances the ability of such solutions to remove mercaptans from hydrocarbon oils.

Although for the purpose of illustrating our invention we have used alkali solutions containing sodium naphthenates as solubility promoters in conjunction with "methyl cellosolve," it is to be understood that "methyl cellosolve" is useful in conjunction with other solubility promoters, such as the alkali metal salts of the low boiling fatty acids, alkali metal salts of high boiling tar acids and alkali salt of acid oil extracted from petroleum hydrocarbons by means of alkali solution.

In using solutions in accordance with the invention, the ratio of solution to liquid being treated may vary over wide limits. However, we prefer to use from 5 to 20% by volume of the treating solution based on the liquid to be treated. Extraction of mercaptans or other acidic bodies from hydrocarbon oils or other water-immiscible liquids may be readily carried out under atmospheric conditions in a countercurrent contact tower containing contact material, such as Raschig rings, in a manner which is conventional for this type of process.

When using "methyl cellosolve" in conjunction with Mercapsol type solutions, the percentage composition of the solution may vary provided the free alkali metal hydroxide content of the solution should not be less than 5% by weight and preferably not less than 10% by weight, the alkali metal naphthenate content should not be less than approximately 10% by weight and a sufficient amount of solventizer should be present to keep the alkali metal naphthenates in the solution. In general, however, we prefer to use aqueous alkali solutions containing at least 10%, and not more than 25%, by weight of free alkali metal hydroxide with amounts of solubility promoter and "methyl cellosolve" adjusted to give solutions of satisfactory viscosity and mercaptan-extracting ability. Both sodium and potassium hydroxide solutions may be used effectively.

We claim:

1. The method of removing mercaptans from hydrocarbon oil which comprises contacting said oil with an aqueous solution containing not less than 10% by weight of free alkali metal hydroxide, not less than 10% by weight of alkali metal naphthenates, sufficient solventizer to keep the naphthenates in solution and not less than about 14% by weight of "methyl cellosolve."

2. Method in accordance with claim 1 in which the solution contains at least 25% by weight of "methyl cellosolve."

3. The method in accordance with claim 1 in which the aqueous solution contains approximately 20% by weight of sodium hydroxide and not less than 40% by weight of "methyl cellosolve."

4. The method of removing mercaptans from cracked gasoline distillate which comprises contacting said distillate with aqueous solution containing from approximately 12 to 25% by weight of free alkali metal hydroxide, alkali metal naphthenates in sufficient quantities to enhance the ability of the alkali metal hydroxide solution to extract mercaptans from the distillate, sufficient phenols to keep the naphthenates in solution and "methyl cellosolve" in amounts from approximately 25% by weight to the maximum amount soluble in the solution.

GEORGE W. AYERS.
LAWRENCE M. HENDERSON.